United States Patent [19]

Wright

[11] 4,370,895
[45] Feb. 1, 1983

[54] FRICTION DRIVE WHEELS

[75] Inventor: David M. Wright, Newcastle-upon-Tyne, England

[73] Assignee: British Gas Corporation, London, England

[21] Appl. No.: 98,823

[22] Filed: Nov. 30, 1979

[30] Foreign Application Priority Data

Jan. 25, 1979 [GB] United Kingdom ............... 7902618

[51] Int. Cl.³ .................... F16H 55/32; B60B 15/00
[52] U.S. Cl. ................................. 74/216; 33/141 G; 73/40.5 R; 74/214; 301/41 R; 301/43
[58] Field of Search ................ 74/214, 216; 474/152, 474/153, 166, 167; 166/170, 171, 172, 173; 254/134.5; 15/104.06 R; 33/141 G; 73/40.5 R; 301/41 R, 43; 222/613, 621

[56] References Cited

U.S. PATENT DOCUMENTS

| 386,605 | 7/1888 | Preater | 74/216 X |
| 672,510 | 4/1901 | McElroy | 74/214 |
| 856,563 | 6/1907 | Apple | 74/214 |
| 2,421,434 | 6/1947 | Reistle, Jr. et al. | 166/173 |
| 2,887,118 | 5/1959 | Loeffler et al. | 15/104.06 R X |
| 2,897,899 | 8/1959 | Hall, Sr. | 166/170 X |
| 3,143,895 | 8/1964 | Robie | 74/214 X |
| 3,654,777 | 4/1972 | Grundman | 74/214 X |
| 3,769,711 | 11/1973 | Flournoy et al. | 33/141 G |
| 4,170,902 | 10/1979 | Pallan | 73/40.5 R X |

FOREIGN PATENT DOCUMENTS

| 594136 | 11/1931 | Fed. Rep. of Germany | 166/170 |
| 565103 | 11/1932 | Fed. Rep. of Germany | 74/214 |
| 353095 | 9/1905 | France | 74/214 |
| 482447 | 6/1953 | Italy | 74/216 |
| 663675 | 12/1951 | United Kingdom | 166/173 |

Primary Examiner—Allan D. Herrmann
Attorney, Agent, or Firm—Lalos, Leeds, Keegan, Lett & Marsh

[57] ABSTRACT

A friction drive wheel, particularly for obtaining a rotary drive for a hydraulic pump or electrical dynamo on a pipeline inspection pig, has a hub with a central hole and keyway for mounting on a axle. Attached to the hub is a rim in which are mounted bundles of bristles in ferrules. The bundle axis is at an acute angle to the radius of the wheel so that the bristles will act as a leading strut. A flange stop may be provided to limit deflection of the bristles.

12 Claims, 6 Drawing Figures

FRICTION DRIVE WHEELS

This invention relates to friction drive wheels and, in particular, to wheels suitable for deriving motive power from translational movement to drive hydraulic pumps, electrical generators and like potential energy sources.

Friction drive wheels are known in many applications for the conversion of translational movement into other forms of energy and vice versa. For example, a knurled wheel which presses against the pneumatic tire is employed to drive the lightening dynamo of a pedal cycle. In co-pending U.S. application Ser. No. 928,408 is described an hydraulic braking system for a pipeline inspection pig which employs a friction wheel bearing against the wall of the pipeline. The wheel rotates as the pig traverses the pipeline and drives a high pressure hydraulic pump which, in turn, actuates a servo-controlled braking system to limit the speed at which the pig travels.

Particularly in applications such as the latter, it is necessary to apply a large force to urge the friction wheel towards the pipeline to prevent the occurrence of slipping. If a conventional solid wheel with an elastomeric tire were employed substantial deformation of the latter would occur. There would be high heat losses due to hysteresis and this would result in rapid degradation of the tire. Furthermore, abrasive detritus, such as dry dust and sand which is frequently found in gas pipelines wears an elastomeric tire. Further difficulties are created by loose surface scale and sludge and fluids which inhibit good contact between the wheel and the pipeline surface.

In order to overcome these difficulties, friction wheels have been constructed in which bristles are mounted around the periphery. These bristles are mounted so that their axes are at an acute angle to a line drawn through the axis of the wheel and act as leading struts to generate a high compressive force along the bristles. This enables the bristle ends to penetrate any film along the pipeline wall and provide good contact.

According to the present invention, there is provided a friction drive wheel having surface engaging means comprising a plurality of bristles, wherein said bristles are mounted so that their axes are arranged in a plane or planes normal to the axis of the wheel and are inclined at an acute angle to a line drawn through the axis of the wheel.

The invention will now be described by way of example with reference to the accompanying drawings which show in elevation and section various embodiments. In the drawings:

FIG. 1a shows a side elevation of a friction wheel with groups of bristles which project for the same distance from the axis of the wheel.

FIG. 1b shows a section taken along the line AA of FIG. 1a.

Figures 1A, 1B:
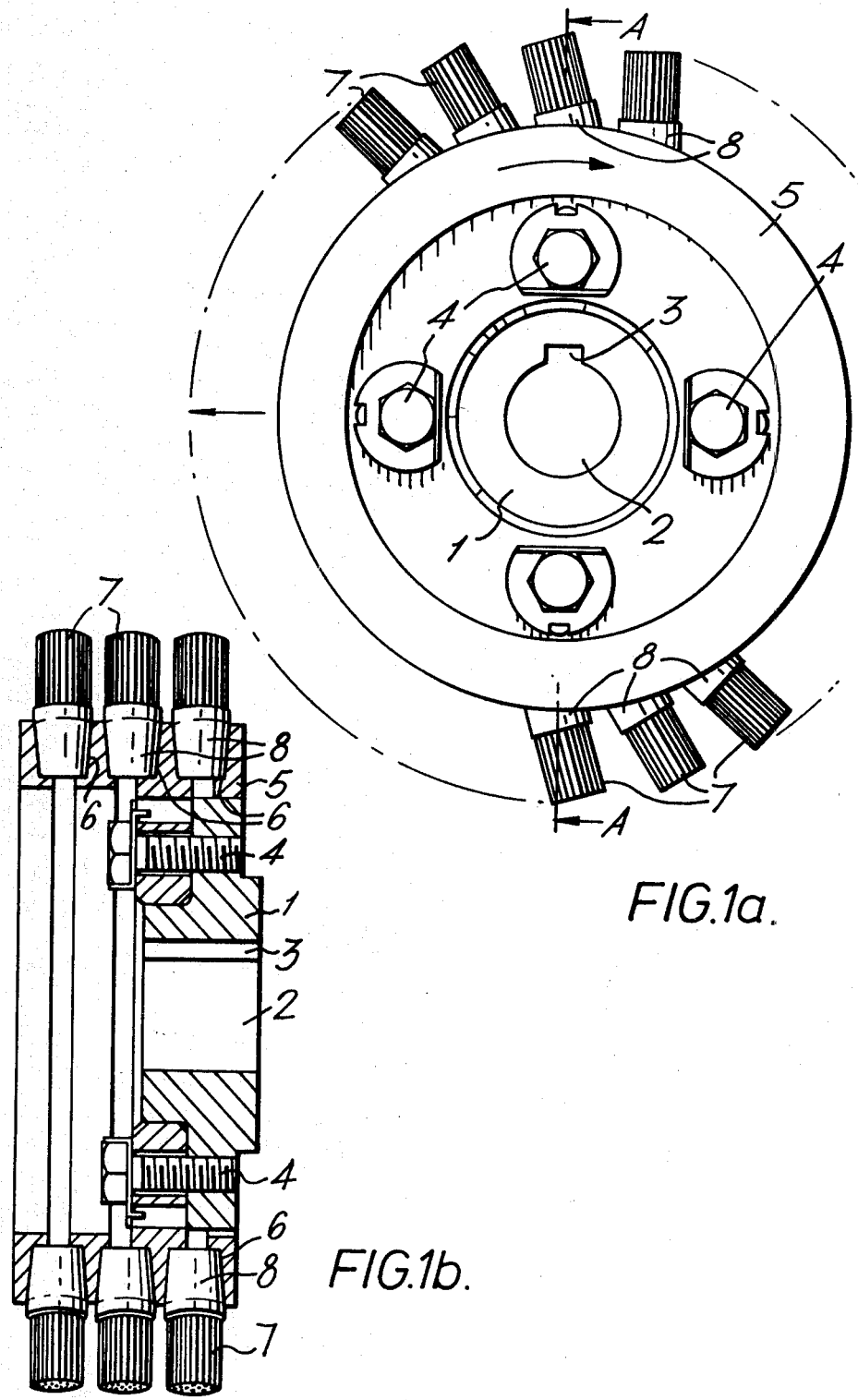

Referring to FIGS. 1a and 1b of the drawings, these show in elevation and section one form of bristle friction drive wheel. A hub 1 has a central hole 2 and keyway 3 for mounting on the axle of an energy conversion device such as an hydraulic pump or an electrical dynamo. Attached to the hub by means of bolts 4 is a peripheral mounting means consisting of a cast rim 5 having holes 6 therein. The holes are arranged in three coplanar groups perpendicular to the axis of the wheel. Each individual hole is arranged with its axis at an acute angle to a line drawn radially through the axis of the wheel.

The method of manufacture is to force bundles 7 of bristles, which may conveniently be of steel which is cheap and durable, into cups or ferrules 8 in which they are held by hard solder. The bundles of bristles are then mounted in the holes in the wheel rims and their ends shaped by grinding. The outer ends of the bristles are arranged to be at approximately the same radial distance from the axis of the wheel.

Figure 2A:
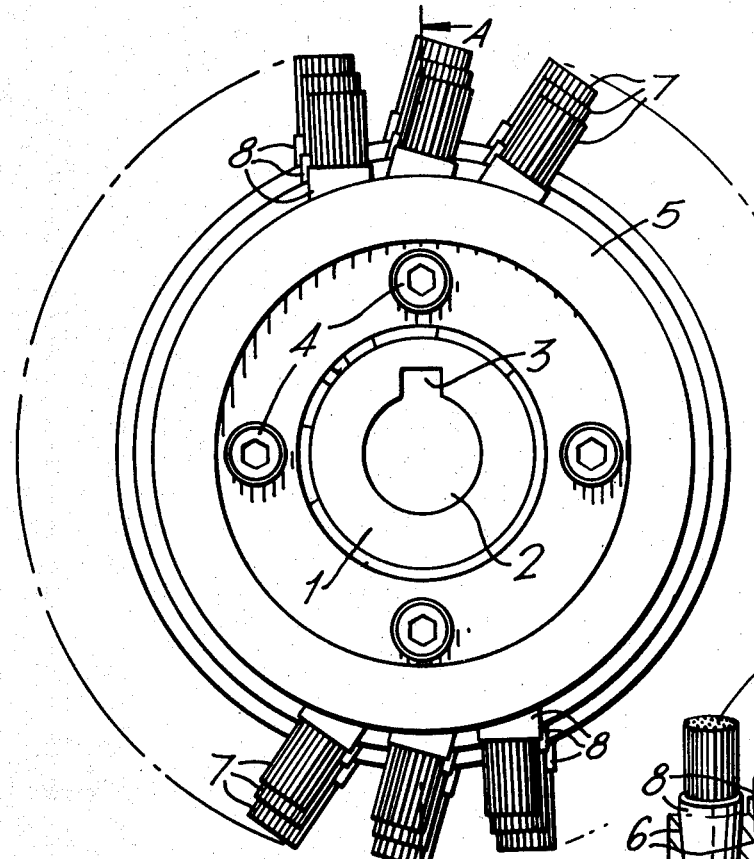
FIGS. 2a and 2b are corresponding illustrations of an alternative construction of friction wheel in which the groups of bundles of bristles project for different distances from the axis of the wheel.
Figure 2B:
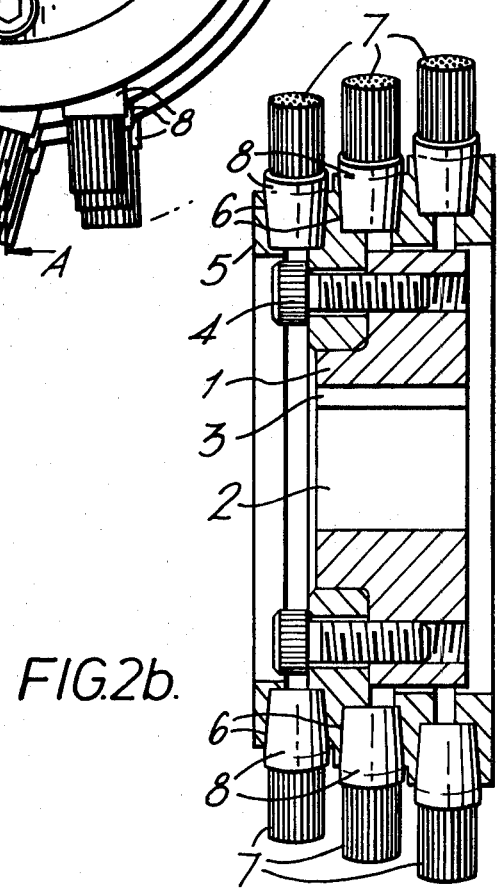

In an alternative arrangement shown in FIGS. 2a and 2b, an outer rim having a stepped sectional profile is employed. In this embodiment, although the ends of the bundles of fibres in each individual group are at substantially constant distance from the axis of the wheel, the distances differ from group to group. Typically, they will lie on the surface of a cone having a half-angle of the order of 10°.

Figure 3:
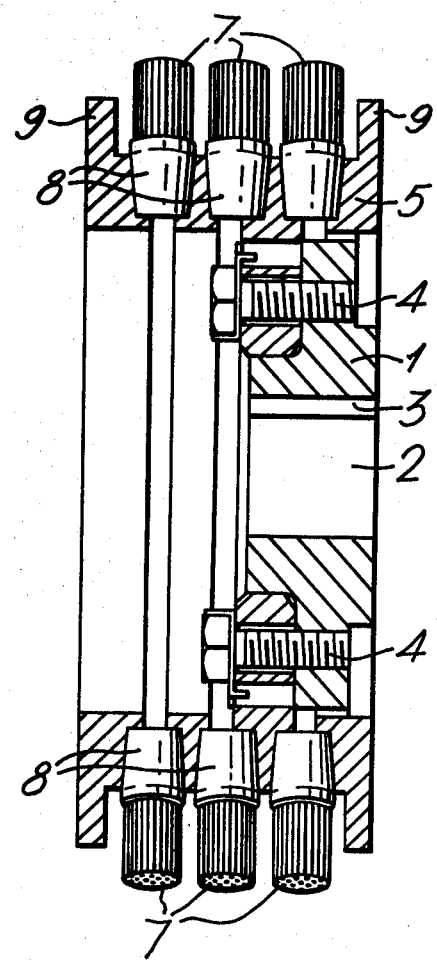
FIG. 3 shows in section a further alternative form of construction.

Yet another modification is shown in FIG. 3. In this embodiment the wheel rims 5 are provided with peripheral flanges 9 which act as a stop to limit the possible deflection of the bristles which may be caused by concentrated impact of the bristles with obstructions in the pipeline such as welds, steps or other features. These flanges will not normally contact the surface on which the wheel runs.

Figure 4:
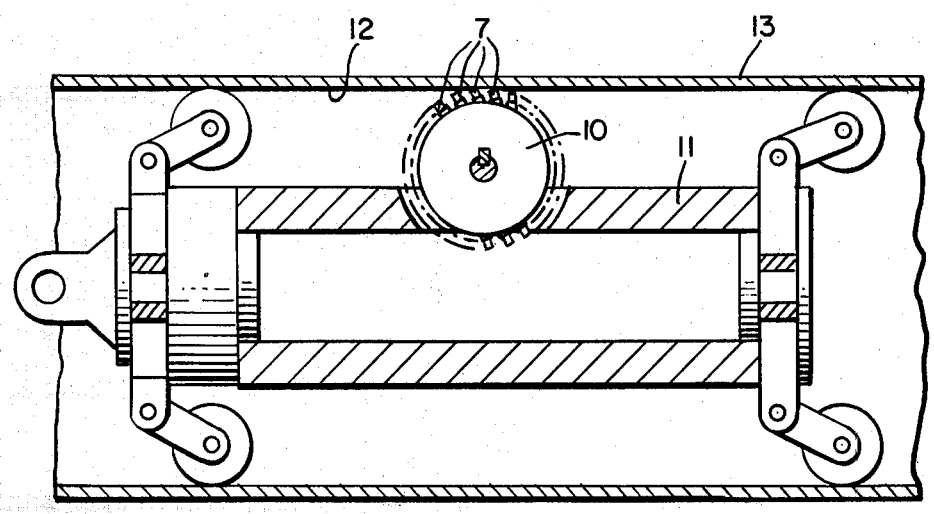
FIG. 4 illustrates a pipeline inspection pig in a pipeline and with a friction drive wheel which embodies the concepts and principles of the present invention mounted thereon.

FIG. 4 shows a pipeline inspection pig 11 in a pipeline 13. A friction drive wheel 10 is rotatably mounted on pig 11. Wheel 10 is equipped with bundles 7 of bristles that are disposed in frictional contact with the interior surface 12 of pipeline 13 to the end that wheel 10 is rotated by such contact as pig 11 moves longitudinally of pipeline 13.

Although the invention has been particularly described in relation to friction drive wheels used to drive auxiliary power sources such as hydraulic pumps used on pipeline inspection pigs, wheels of the type described are of more general application and may, for example, be used in a complementary manner to convert potential energy to translational movement.

I claim:

1. A friction drive wheel adapted to be mounted upon a pipeline inspection pig for continuous rotation about an axis perpendicular to the normal direction of movement of the pig as the latter moves longitudinally through a pipeline, said wheel being adapted to rotate with its circumferential periphery in frictional contact with the interior surface of the pipeline during said movement, said wheel having surface-engaging means comprising a plurality of bristles mounted with their longitudinal axes arranged in one or more planes extending normally of the axis of rotation of the wheel and with said longitudinal axes inclined at an acute angle relative to a line extending perpendicularly through said axis of rotation.

2. A friction drive wheel as claimed in claim 1, wherein the bristles are of metal.

3. A friction drive wheel as claimed in claim 2, wherein said bristles are of steel.

4. A friction drive wheel as claimed in claim 1, wherein said bristles are arranged in bundles.

5. A friction drive wheel as claimed in claim 4, wherein said bundles are held in mounting means consisting of a cup or ferrule.

6. A friction drive wheel as claimed in claim 5, wherein said bristles are of metal and are held in the cup or ferrule by solder.

7. A friction drive wheel as claimed in claim 4, wherein said bundles of bristles are held in peripheral mounting means which is, in turn, mounted on or integral with an axial hub.

8. A friction drive wheel as claimed in claim 7, wherein said bundles are arranged in a plurality of groups, the bundles of each group being substantially coplanar and displaced axially on the axis of the wheel from the bundles of any other group.

9. A friction drive wheel as claimed in claim 8, wherein the distance from the axis of the wheel of the outer ends of the bristles in each group of bundles is substantially constant.

10. A friction drive wheel as claimed in claim 8, wherein the distance from the axis of the outer ends of the bristles in a given group of bundles is substantially constant and differs from that of any other group.

11. A friction drive wheel as claimed in claim 10, wherein the distance increases from one side of the wheel to the other in a graded manner.

12. A pipeline inspection pig including a friction drive wheel mounted thereon for continuous rotation about an axis perpendicular to the normal direction of movement of the pig as the latter moves longitudinally through a pipeline, said wheel being adapted to rotate with its circumferential periphery in frictional contact with the interior surface of the pipeline during said movement, said wheel having surface-engaging means comprising a plurality of bristles mounted with their longitudinal axes arranged in one or more planes extending normally of the axis of rotation of the wheel and with said longitudinal axes inclined at an acute angle relative to a line extending perpendicularly through said axis of rotation.

* * * * *